Figure 1:
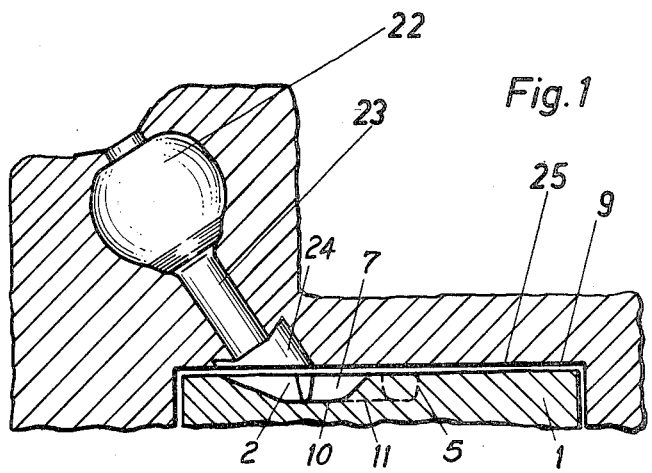

July 27, 1965     K. D. ZIMMERMANN     3,196,857

COMPRESSION-IGNITION INTERNAL COMBUSTION ENGINES

Filed June 5, 1963     2 Sheets-Sheet 1

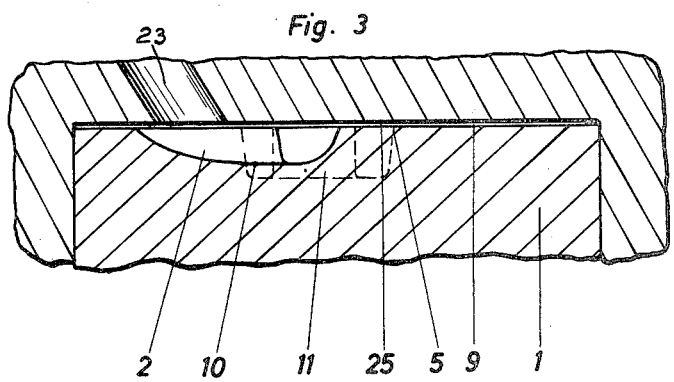
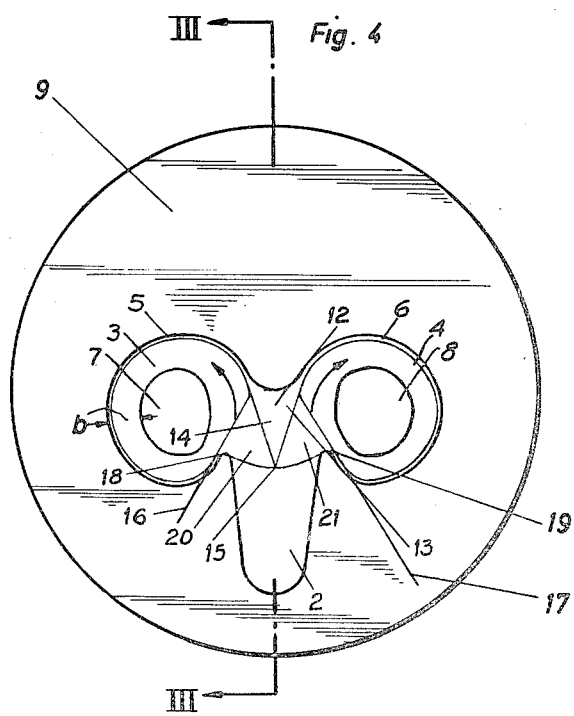

United States Patent Office 3,196,857
Patented July 27, 1965

3,196,857
COMPRESSION-IGNITION INTERNAL
COMBUSTION ENGINES
Klaus Dieter Zimmermann, Heidelberg, Germany, assignor to Motoren-Werke Mannheim A.G. vorm. Benz Abt. Stat. Motorenbau, Mannheim, Germany, a German company
Filed June 5, 1963, Ser. No. 285,703
Claims priority, application Germany, June 22, 1962, M 53,287
5 Claims. (Cl. 123—32)

This invention relates to compression-ignition internal combustion engines having a divided combustion chamber.

Compression-ignition internal combustion engines having a pre-combustion chamber into which fuel is injected towards the end of the compression stroke, and which is connected to a cylinder chamber by an off-centre, constricted and obliquely arranged duct are known. Said duct is directed towards one end of an inlet channel in the form of a depression in the piston end surface, the channel extending from said one end towards the central part of the cylinder and being continued as two depressions each having a circular periphery. The depressions are let into the piston end surface and are situated near the valve heads of the inlet and exhaust valves.

It is an object of the invention to improve the combustion of the burning fuel mixture issuing from the pre-combustion chamber into the cylinder chamber.

Another object of the invention is to reduce thermal stressing of the cylinder head by lowering the exhaust gas temperature, this being a consequence of the improvement of the combustion. This last-mentioned object is of special importance in air-cooled diesel engines. The desired improvement of the combustion also results in a reduction of the specific fuel consumption.

According to the present invention there is provided a compression-ignition internal combustion engine comprising a pre-combustion chamber into which fuel is injected towards the end of the compression stroke of each operative cycle of the engine, a cylinder, a valve controlled outlet and a valve controlled inlet at one end of said cylinder, a duct connecting said pre-combustion chamber to said cylinder, said duct being arranged obliquely to and offset with respect to the longitudinal centre line of the cylinder, and a piston slidable within said cylinder and having an operative face formed with a channel arranged to communicate with said duct and to direct combustion gases flowing therefrom towards the centre of said operative face of said piston and with two depressions of annular form for receiving gases from said channel such depressions being disposed one adjacent a valve controlled inlet and the other adjacent a valve controlled outlet from the cylinder.

Due to the annular form of the depressions, in which the burning mixture forms a rotating eddy, the entire whirling combustion air is situated at the place to which the still unburnt fuel particles are forced by the centrifugal force of the rotating eddy, i.e. in the vicinity of the circular periphery. The zone poor in fuel in the interior of the known disc-shaped depressions, in which the available air is poorly utilised, is thereby avoided.

Advantageously, the radial width of the circular ring-shaped depression diminishes in the direction of flow of the mixture issuing from the duct. In consequence of this dimensioning, the cross section of the circular ring diminishes in the said direction, whereby an accelerated flow is obtained, which has lower deflection losses and hence results in improved mixture formation.

Easy production by milling is obtained by the fact that the bottom surfaces of the inlet channel and depressions are flat and of equal depth.

In internal combustion engines of the type to which this invention relates and in which the peripheral walls of the depressions, in the centre of the inlet channel at its end sittuated in the vicinity of the cylinder centre, form a nose, on which the burning mixture issuing from the duct strikes and is deflected at that point, a reduction in the thermal stressing of this otherwise very endangered nose is advantageously secured by the fact that tangents which, at the penetration edges, most remote from the cylinder centre, of the inlet channel with the peripheral walls of the depressions, are applied to said depressions, are directed towards the lateral walls of the nose, so that the burning mixture, which has rotated once in the depressions, is deflected into them again without striking the tip of the nose. The tip of the nose, from which otherwise heat cracks readily start, is only struck once in a working stroke and is thereby heated less, so that the light metal of the piston is less prone to cracking at that point.

Easy emergence of the mixture, issuing from the duct, from the inlet channel into the depressions, in which mixture formation principally takes place, is promoted by the fact that the bottom surface of the inlet channel is let into the piston end less deeply than the bottom surface of the depressions, and that inclined surfaces, adjoining the lateral walls of the nose, extend from the bottom surface of the inlet channel to the bottom surfaces of the depressions.

Figure 2:
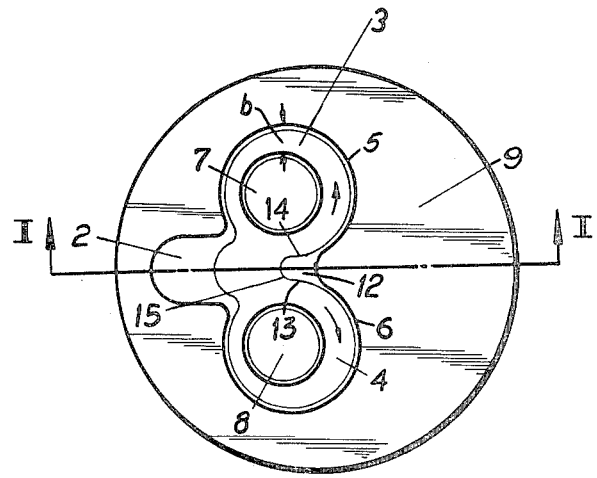

For a better understanding of the invention and to show how the same may be carried into effect reference will now be made to the accompanying drawings, in which:

FIG 1 is a vertical section, on the line I—I of FIG. 2, through the divided combustion chamber and the upper part of the corresponding piston of a compression-ignition internal combustion engine, FIG. 2 is a plan view of the piston shown in FIG. 1, FIG. 3 is a vertical section, on the line III—III of FIG. 4, through a modified form of compression-ignition internal combustion engine piston, and FIG. 4 is a plan view of the piston shown in FIG. 3.

Referring firstly to FIGS. 1 and 2, in the top dead centre position of the piston 1 (as shown), the cylinder chamber part of the divided combustion chamber is formed principally by the inlet channel 2 and depressions 3 and 4 of annular form. The depressions 3 and 4 and the channel 2 are formed in the top surface of the piston 1. The depressions 3 and 4 are bounded externally by peripheral walls 5 and 6 which, as shown in FIG. 2, are circular when viewed in plan, or, as shown in FIG. 4, are approximately circular when viewed in plan. Within the depressions 3 and 4 are elevations or raised portions 7 and 8, the top of which portions are in the same plane as the piston top surface 9. As shown, the peripheral walls 5 and 6 may be slightly inclined, or may be perpendicular to the piston top 9. The same applies to the side faces of the elevations 7 and 8.

The width $b$ of the annular depressions 3 and 4, diminishes in the direction of the arrows in FIG. 2, that is to say, in the direction of flow of the burning mixture issuing from a duct 23 which connects the cylinder chamber with a pre-combustion chamber 22. The depth of the inlet channel 2, and the depth of the depressions 3 and 4 is, as shown in FIG. 1, the same and the bottom 10 of the channel 2 and the bottom 11 of the depressions 3 and 4 are flat. The peripheral walls 5 and 6 join to form a nose 12, lateral walls 13 and 14 of which nose 12 slopes like a roof and terminates in a tip 15. As will be seen from FIG. 4, the peripheral walls 5 and 6 may be so formed that the tangents 16 and 17 to the peripheral walls 5 and 6 at the edges 18 and 19 are directed towards the lateral walls 13 and 14.

The flat bottom 10 of the inlet channel 2 may also be less deep than the flat bottom 11 of the depressions 3 and 4. This is shown in FIG. 3. In this case, inclined surfaces 20 and 21 extend from the bottom surface 10 of the inlet channel 2 to the bottom surfaces 11 of the depressions 3 and 4. These inclined surfaces are adjacent the lateral walls 13 and 14 of the nose 12.

In FIG. 1 a constructional form of pre-combustion chamber 22 is shown. This pre-combustion chamber 22 is approximately spherical and receives more than 50% of the combustion air at top dead centre. The duct 23, as shown in FIG. 1, may have its mouth in a dead space 24 or may have an enlargement; as shown in FIG. 3, however, it may be flush with the cylinder head bottom surface 25. Together with the pistons described it is also possible to use divided combustion chambers in the form of whirling chambers, i.e. with the duct applied to one side.

I claim:

1. A compression-ignition internal combustion engine comprising a pre-combustion chamber into which fuel is injected towards the end of the compression stroke of each operative cycle of the engine, a cylinder, a valve controlled outlet and a valve controlled inlet at one end of said cylinder, a duct connecting said pre-combustion chamber to said cylinder, said duct being arranged obliquely to and offset with respect to the longitudinal centre line of the cylinder, and a piston slidable within said cylinder and having an operative face formed with a channel arranged to communicate with said duct and to direct combustion gases flowing therefrom towards the centre of said operative face of said piston and with two depressions of annular form for receiving gases from said channel such depressions being disposed one adjacent a valve controlled inlet and the other adjacent a valve controlled outlet from the cylinder.

2. A compression-ignition internal combustion engine according to claim 1, wherein the radial width of each depression of annular form decreases over the extent of the depression for accelerating gases flowing in each depression of annular form.

3. A compression-ignition internal combustion engine according to claim 1, wherein said channel and the depressions of annular form are all of equal depth, and said channel and said depressions of annular form have flat bottom surfaces.

4. A compression-ignition internal combustion engine comprising a pre-combustion chamber into which fuel is injected towards the end of the compression stroke of each operative cycle of the engine, a cylinder, a valve controlled outlet and a valve controlled inlet at one end of said cylinder, a duct connecting said pre-combustion chamber to said cylinder, said duct being arranged obliquely to and offset with respect to the longitudinal centre line of the cylinder, and a piston slidable within said cylinder and having an operative face formed with a channel arranged to communicate with said duct and to direct combustion gases flowing therefrom towards the centre of said operative face of said piston and also formed with two depressions of annular form for receiving gases from said channel, said depressions being disposed one adjacent a valve controlled inlet and the other adjacent a valve controlled outlet to the cylinder, and each depression having an outer peripheral wall, the two outer peripheral walls merging with one another to form a nose, having side surfaces and a tip and upon which nose gases flowing in said channel from said duct impinge and are deflected into said depressions, said outer peripheral walls also including parts arranged for directing whirling gases flowing from the depressions into the channel past said tip and against the side surfaces of the nose for re-deflection into said depressions.

5. A compression-ignition combustion engine according to claim 4, wherein the first and second depressions are deeper than said channel, and wherein inclined surfaces adjacent said side surfaces of said nose connect a bottom surface of the channel to bottom surfaces of said depressions.

No references cited.

RICHARD B. WILKINSON, *Primary Examiner.*